(12) United States Patent
Chakrabarti et al.

(10) Patent No.: US 8,255,793 B2
(45) Date of Patent: Aug. 28, 2012

(54) AUTOMATIC VISUAL SEGMENTATION OF WEBPAGES

(75) Inventors: Deepayan Chakrabarti, Mountain View, CA (US); Manav Ratan Mital, Sunnyvale, CA (US); Swapnil Hajela, Fremont, CA (US); Emre Velipasaoglu, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1243 days.

(21) Appl. No.: 11/971,160

(22) Filed: Jan. 8, 2008

(65) Prior Publication Data
US 2009/0177959 A1 Jul. 9, 2009

(51) Int. Cl.
*G06N 3/00* (2006.01)
(52) U.S. Cl. .................................................. 715/234
(58) Field of Classification Search .................. 715/234, 715/240, 241, 243, 246, 247, 254, 273
See application file for complete search history.

(56) References Cited

U.S. PATENT DOCUMENTS

| | | | | |
|---|---|---|---|---|
| 6,300,947 B1* | 10/2001 | Kanevsky | ................. | 715/866 |
| 6,556,217 B1* | 4/2003 | Makipaa et al. | ............. | 345/667 |
| 7,065,707 B2* | 6/2006 | Chen et al. | ................ | 715/234 |
| 7,783,642 B1* | 8/2010 | Feng et al. | ................ | 707/739 |
| 7,853,871 B2* | 12/2010 | Simons et al. | .............. | 715/238 |
| 7,900,149 B2* | 3/2011 | Hatcher et al. | .............. | 715/760 |
| 2002/0016801 A1* | 2/2002 | Reiley et al. | .............. | 707/523 |
| 2002/0099739 A1* | 7/2002 | Fischer | ................... | 707/515 |
| 2003/0050931 A1* | 3/2003 | Harman et al. | ............. | 707/100 |
| 2003/0236917 A1* | 12/2003 | Gibbs et al. | ............... | 709/248 |
| 2004/0095400 A1* | 5/2004 | Anderson et al. | ............ | 345/864 |
| 2004/0103371 A1* | 5/2004 | Chen et al. | ................ | 715/513 |
| 2005/0195221 A1* | 9/2005 | Berger et al. | .............. | 345/660 |
| 2006/0149726 A1* | 7/2006 | Ziegert et al. | .............. | 707/5 |
| 2006/0230100 A1* | 10/2006 | Shin et al. | ................ | 709/203 |
| 2006/0282758 A1* | 12/2006 | Simons et al. | .............. | 715/500 |
| 2007/0083810 A1* | 4/2007 | Scott et al. | ............... | 715/525 |
| 2008/0094420 A1* | 4/2008 | Geigel et al. | .............. | 345/660 |
| 2008/0307328 A1* | 12/2008 | Hatcher et al. | .............. | 715/760 |
| 2010/0312728 A1* | 12/2010 | Feng et al. | ................ | 706/12 |

OTHER PUBLICATIONS

Vadrevu, Srinivas, et al., "Semantic Partitioning of Web Pages", Springer Verlag Heidelberg, 2005, 12 pages.
Chen, Jinlin, et al., "Function based Object Model Towards Website Adaption", Microsoft Research China, WWW10, May 2001, ACM, 13 pages.
Zou, Jie, et al., "Combining DOM Tree and Geometric Layout Analysis for Online Medical Journal Article Segmentation", ACM, JCDL, 2006, 10 pages.
Baluja, Shumeet, "Browsing on Small Screens: Recasting Web-Page Segmentation into an Efficient Machine Learning Framework", International World Wide Web Conference Committee, 2006, 10 pages.
Cai, Deng et al., "VIPS: A Vision-based Page Segmentation Algorithm", Microsoft Corporation, Nov. 2003, Technical Report MSR-TR-2003-79, 29 pages.
Kao, Hung-Yu, et al., "WISDOM: Web Intrapage Informative Structure Mining Based on Document Object Model", IEEE Transactions on Knowledge and Data Engineering, vol. 17, No. 5, May 2005, 14 pages.

* cited by examiner

*Primary Examiner* — Kyle Stork
(74) *Attorney, Agent, or Firm* — Hickman Palermo Truong Becker Bingham Wong LLP (57) ABSTRACT

To provide valuable information regarding a webpage, the webpage must be divided into distinct semantically coherent segments for analysis. A set of heuristics allow a segmentation algorithm to identify an optimal number of segments for a given webpage or any portion thereof more accurately. A first heuristic estimates the optimal number of segments for any given webpage or portion thereof. A second heuristic coalesces segments where the number of segments identified far exceeds the optimal number recommended. A third heuristic coalesces segments corresponding to a portion of a webpage with much unused whitespace and little content. A fourth heuristic coalesces segments of nodes that have a recommended number of segments below a certain threshold into segments of other nodes. A fifth heuristic recursively analyzes and splits segments that correspond to webpage portions surpassing a certain threshold portion size.

22 Claims, 10 Drawing Sheets

AUTOMATIC VISUAL SEGMENTATION OF WEBPAGES

FIELD OF THE INVENTION

The present invention relates to webpage segmentation in general. More specifically, the invention relates to webpage segmentation using visual and structural aspects of a webpage.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Webpages form the core input dataset for all Internet search and advertising companies, and this necessitates the development of algorithms for the proper analysis of webpages. Understanding the structure and content of a webpage is useful in a variety of contexts.

A basic problem for an Internet search engine is that of finding good results for a search query. The basic premise of all search engines today is that a webpage that contains all (or most) of the terms specified in a query string is a good candidate as an answer to the search query. However, this idea is violated in a large number of cases. Consider, for instance, a webpage containing lyrics of a song X, but with links at the bottom of the page to other pages containing fragments from lyrics of other popular songs Y and Z. A search query for Y and Z will match this page, since both Y and Z are mentioned on the page; clearly, however, the page does not contain the information the user is looking for. Similarly, Y and Z may be text in the advertisements appearing on the webpage. In another instance, a search for "copyright for company X" ought to return the main legal webpage in the website for company X, and not every page in that website that has a small "copyright" disclaimer at the bottom.

As another example, a New York Times webpage may have a headline bar, sports, news items, and a copyright notice. A user may search for keywords such as "New York Times legal information." There is probably some webpage on the New York Times web site that provides much legal information. But the keywords may also match a news page that does not provide the relevant search results. To provide more meaningful information about a webpage, it is useful to figure out that the webpage is mainly about the news item, and that the other content available on that webpage is slightly relevant but not the most important in that webpage. Thus, splitting up a webpage into different sections is useful to provide more relevant search results.

The main idea illustrated by these examples is simply that query terms should be matched only to the "main content" of a webpage, and not to all the side information and "look-and-feel" aspects of the webpage. This demonstrates the necessity of breaking up a webpage into blocks, or segments, each of which is a separate semantic unit of a webpage that is unrelated to the others. A block is a provisional segment, and a block can be a segment, or multiple blocks may be merged into a segment. Blocks may also be further divided into multiple blocks.

A segmentation operation could put song lyrics and links to other lyrics pages in separate segments, create segments for ads or copyright notices on the page, and so on. A webpage may be divided into different segments such as the main content, navigation bar, advertising, footer, and so on.

DOM Trees

Every webpage can be represented as a DOM tree, with some nodes of the tree representing text, images and other content, while others specify how these should be rendered on the screen with respect to other nodes. Thus, the DOM tree provides information on both content and presentation. A segment may be assigned to any arbitrary collection of nodes in a DOM tree no matter what the relationship between the nodes. However, the assignment of segments in a DOM tree is hierarchical in the sense that a segment corresponding to a node in the DOM tree either strictly contains or is same as the segment corresponding to the children nodes of the node. In other words, if a node of a DOM tree belongs to a particular segment, then all descendants of that node also belong to that particular segment. Partial overlap between segments in the DOM tree is not allowed. The DOM tree for a given webpage may be considered as a hierarchical segmentation itself, albeit with a very high level of granularity.

The point at which a segment is identified must not be too high up towards the root of the DOM tree. If a segment is specified at too high a level in the DOM tree hierarchy, too many nodes may have their blocks merged together. Nor should the segment identification be so low down the DOM tree that only bits and pieces of the DOM tree are identified as part of the segment, missing the whole correct segment section. There must be some criteria to decide what nodes constitute a segment.

The problem of finding distinct semantically coherent segments within a given webpage is a very important one. It is, however, a hard problem, for several reasons. First, a machine learning algorithm to perform segmentation would require a large amount of training data in order to represent all different kinds of segmentations found on the World Wide Web. Second, the segmentation algorithm must be extremely fast and scalable for it to be applied to a dataset of the size of the Web. A slightly rough but quick segmentation is preferable to one that is more accurate but slows down the entire webpage processing pipeline considerably. Third, the number of segments must not be excessive.

DOM-Based Segmentation

Dividing a webpage into segments may be performed using DOM-based techniques. The creator of a webpage may write the webpage in HTML, and the HTML may be represented as a DOM tree structure, which is used to render the webpage on the user's screen. For every rendering of a webpage, there may be many DOM trees, due to particular parser implementations and the flexibility of HTML syntax. Because of such flexibility, mistakes in DOM tree structure may occur because many webpages do not obey the W3C specifications.

DOM trees were not meant to describe semantic structure, but to merely describe presentation. Therefore, simply examining the DOM tree of a webpage to determine the segments of the webpage will result in some missed segments. For example, assume a table of camera models, camera descriptions, and camera prices, separated into the columns of the table. The column of prices should be a segment, because the column contains just numbers. However, nodes in the DOM tree of the webpage that represent the camera prices may not have the same parent in the DOM tree. The reason that the nodes that represent different camera prices may have different parents is that the children nodes of the table node are row nodes, not column nodes. Under these circumstances, the price node may each have a different parent node because each price node is on a different row. Thus, due to the DOM specification, there is no one node in the DOM tree of the webpage that represents the camera prices column. The camera prices column, therefore, cannot easily be said to be a segment by looking at the DOM tree. Existing approaches fail on many such webpages.

Visual Segmentation

Recent techniques to divide a webpage into segments focus on visual segmentation. Visual segmentation involves breaking apart a DOM tree using visual information, i.e. the visual aspects of a rendered webpage. While a DOM tree representation completely encodes all information about a webpage, the DOM tree structure is not very well suited to understanding and processing the visual layout of the webpage. For instance, nodes that are close to each other in the DOM tree are typically rendered close to each other, but are not necessarily so rendered. Two nodes may be adjacent in the DOM tree, but be separated by a visible line when rendered, clearly implying that these nodes belong to different segments.

One technique for segmenting a webpage divides a rendered webpage into little blocks, and then tries to determine which blocks are most separated by whitespace. Some existing techniques use spatial and visual cues according to human perceptions to divide webpages into semantic parts. Separators such as horizontal or vertical lines in a webpage are part of a page layout of the webpage that helps to determine segments. Other techniques use background color, font size, font color, etc. to segmentize webpages.

However, existing techniques do not efficiently identify segments for certain webpage configurations. In view of the above, it is desirable to more efficiently and accurately identify segments of a webpage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for segmenting webpages is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Functional Overview

To overcome the shortcomings of existing segmentation techniques, an improved mechanism is provided for segmenting webpages. According to one embodiment, a segmentation algorithm determines an optimal number of segments for a given webpage, taking into account the portion of a webpage screen space occupied by the segments. In an embodiment, a segmentation algorithm identifies segments by examining the contents of screen areas. In an embodiment, a segmentation algorithm reduces the number of segments into which a webpage is divided in situations where visually rendered portions of a webpage occupy insufficient webpage space to allow for a segment. In an embodiment, a segmentation algorithm identifies, as part of the same segment, nodes that are not siblings in the DOM tree but are visually close together in the rendered page. In an embodiment, a segmentation algorithm increases the number of segments by dividing blocks that are too coarse.

In an embodiment, a rule-based processor with an expandable rule-set segmentizes webpages. The rule-set is expandable by learning further rules based on the initial set of rules built into the system. In an embodiment, humans may label webpages for segment detection.

Accurate segmentation of webpages may be useful in numerous contexts, For example, accurate webpage segmentation may be used to enhance the quality of search results for a search query by focusing search activity on content from a segment of a webpage that contains the "main content" of the webpage.

As another example, webpage segmentation is used to accurately classify a webpage into a given set of categories. In an embodiment, a Web search query result can provide summaries of webpages with greater accuracy and greater speed by concentrating a webpage summary generation process on an appropriate segment.

As yet another example, finding appropriate entry point webpages on a website is performed more quickly and accurately by detecting an appropriate segment that lists such entry points. Entry points into a website are webpages in the site hierarchy that conceptually organize the website into semantically separate blocks. For instance, a website may have webpages broadly grouped under search, mail, finance, etc. Such entry points are often listed by webpage maintainers in a navigation bar on the webpage.

In an embodiment, navigation bars in a webpage are more accurately identified. In an embodiment, FAQ webpages are more accurately segmented.

An Exemplary Segmented Webpage and Corresponding DOM Tree

Figure 1:
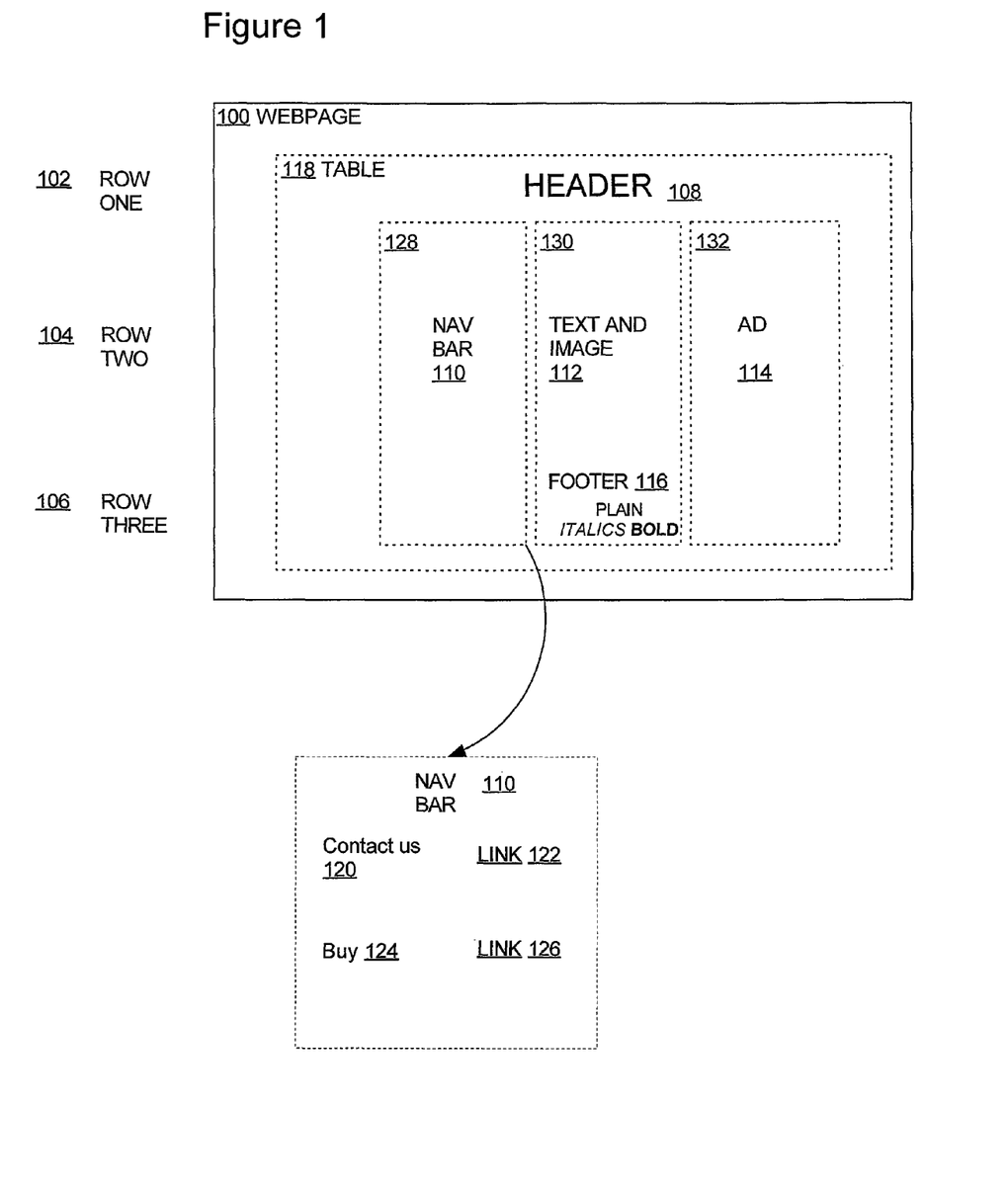
FIG. 1 is a block diagram illustrating an exemplary rendered webpage.
Figure 2:
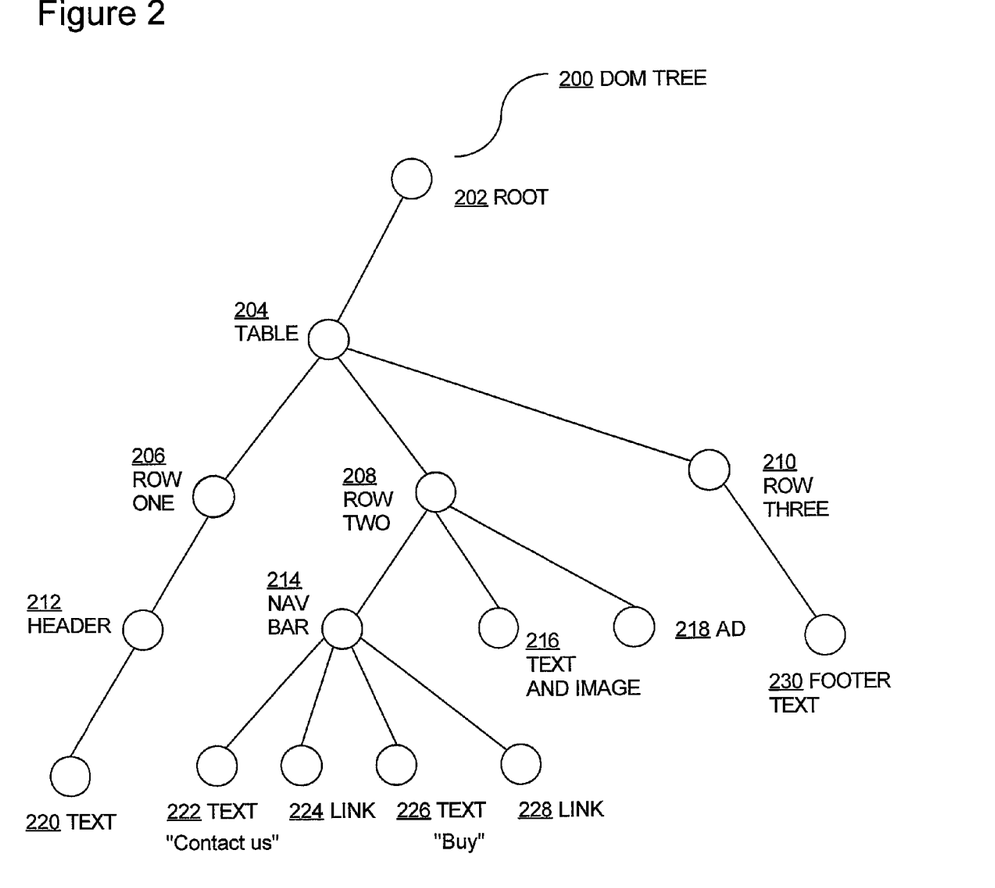
FIG. 2 is a block diagram illustrating a DOM tree corresponding to the exemplary rendered webpage of FIG. 1.

FIG. 1 and FIG. 2 illustrates a segmented webpage and a DOM tree, respectively, for purposes of understanding one exemplary webpage and corresponding DOM tree with which embodiments of the invention may be practiced. Other webpages and DOM trees with which embodiments of the invention may be practiced may include different styles, content, presentation, or structure. FIG. 1 illustrates an exemplary webpage WEBPAGE 100, and FIG. 2 illustrates a corresponding DOM tree for the webpage of FIG. 1. WEBPAGE 100 contains TABLE 118. The first row of TABLE 118 contains header information HEADER 108. There are three rows, ROW ONE 102, ROW TWO 104, and ROW THREE 106 in TABLE 118. There is a navigation bar NAVBAR 110, text and images TEXT AND IMAGE 112, and advertising AD 114 in TABLE 118. TEXT AND IMAGE 112 may contain text with various different formatting. A footer FOOTER 116 may also contain various different formatting, such as plain text, italicized text, and bold text. As part of NAVBAR 110, there may be a number of text and link pairs. In NAVBAR 110, one such text and link pair is the text "Contact us" 120 and the link LINK 122. Another such pair of text and link is "Buy" 124 and LINK 126.

FIG. 2 illustrates the DOM tree DOM TREE 200 corresponding to WEBPAGE 100. There may be a node TABLE 204 connected to the root of the DOM tree ROOT 202, with three children nodes ROW ONE 206, ROW TWO 208, and ROW THREE 210. Each child node corresponds to each of the rows of the webpage ROW ONE 102, ROW TWO 104, and ROW THREE 106. ROW ONE 206 has a child node HEADER 212. HEADER 212 has a child node TEXT 220. ROW TWO 208 may have three children nodes, i.e. a node NAVBAR 214, a node TEXT AND IMAGE 216, and a node AD 218. ROW TWO 208 in the DOM tree of FIG. 2 corresponds to ROW TWO 104 in the visual layout of the corresponding rendered webpage of FIG. 1. ROW THREE 210 has one child node FOOTER TEXT 230. FOOTER TEXT 230 in the DOM tree corresponds to FOOTER 116 in the rendered webpage of FIG. 1.

NAVBAR 214 in the DOM tree of FIG. 2 corresponds to NAVBAR 110 in the visual layout of the same webpage as shown in FIG. 1. TABLE 204 in the DOM tree of FIG. 2 corresponds to TABLE 118 of FIG. 1. TEXT AND IMAGE 216 in the DOM tree of FIG. 2 corresponds to the TEXT AND IMAGE 112 in FIG. 1. AD 218 in the DOM tree of FIG. 2 corresponds to AD 114 in FIG. 1.

NAVBAR 214 may have a number of children nodes that contain both a text and a link corresponding to that text. TEXT 222 containing "Contact us" and LINK 224 are one pair of children nodes of NAVBAR 214. TEXT 222 corresponds to the text "Contact us" 120 in the visual layout of the webpage. LINK 224 corresponds to the link LINK 122 in the visual layout of the webpage. TEXT 226 containing "Buy" and LINK 228 are another pair of children nodes of NAVBAR 214. TEXT 226 corresponds to the text "Buy" 124 in the visual layout of the webpage. LINK 228 corresponds to the link LINK 126 in the visual layout of the webpage. NAVBAR 110 is one example of navigation bars. NAVBAR 110 and WEBPAGE 100 will be modified in examples hereafter as necessary for purposes of illustrating embodiments of the invention.

An illustrative example segmentation of WEBPAGE 100 may be as follows: NAVBAR 110 may form a segment 128. TEXT AND IMAGE 112 and the footer with variously formatted text FOOTER 116 together may form another segment 130. AD 114 may form a third segment 132. There may be more than one way to divide a webpage into segments. Such a division of a webpage into segments is an example of applying the segmentation techniques described hereafter.

Overview

Figure 9:
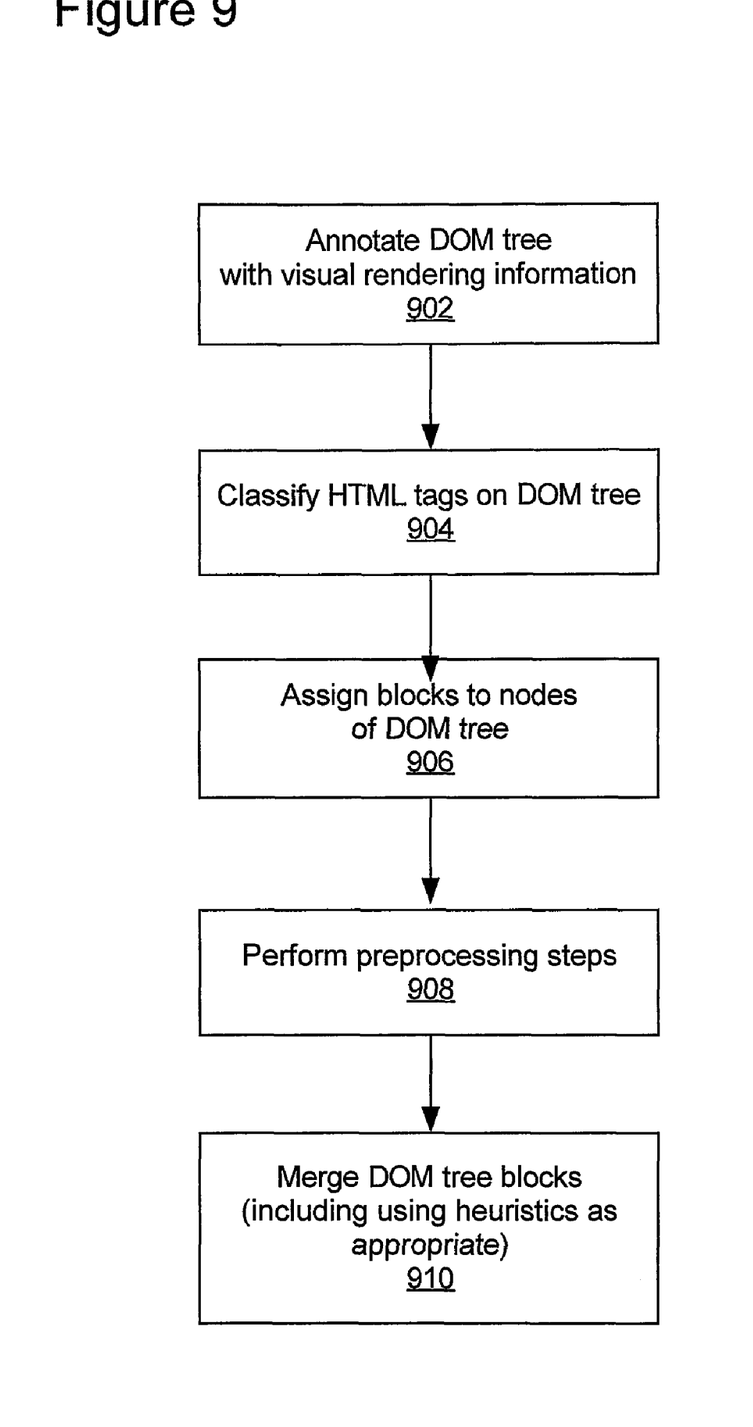
FIG. 9 is a flow diagram illustrating a technique for performing webpage segmentation, according to an embodiment of the invention.

A method based on a set of heuristics is used to perform webpage segmentation. FIG. 9 is a flow diagram illustrating a technique for performing webpage segmentation, according to an embodiment of the invention. First, a DOM tree corresponding to the webpage is annotated with information about where the contents corresponding to each node are located on a rendered webpage in step 902. Second, HTML tags at each node are classified in step 904. Third, nodes are assigned blocks in step 906. Fourth, preprocessing steps are applied to initially reduce the number of blocks in step 908. Finally, heuristics are applied to the DOM tree to further reduce or increase the number of blocks as necessary, to achieve an optimal number of blocks in step 910. The blocks that remain after the heuristics are applied are determined to be segments.

Annotations of DOM Tree

A method, as an embodiment of the invention, operates on a webpage described in the common HTML format. A rendering engine annotates each node of a DOM tree corresponding to the webpage with visual information. Specifically, the rendering engine annotates each node with information about a bounding box of the visual area on the screen where the content associated with the node would be rendered. Such annotations may include, for example, the four-tuple (x,y,w,h) where (x,y) are the X-Y coordinates of the top-left corner of the bounding box, and w and h are the length and breadth of the bounding box. Every text or DOM node has a bounding box area, on the screen, on which the contents represented by the node are displayed. In an embodiment, the X-Y coordinates may be determined according to some standard setup. That is, the X-Y coordinates may be based on an assumption that the user is using some standard screen resolution, and that the user is using some standard browser, such as a Mozilla implementation. A rendering engine, such as the Mozilla rendering engine, may perform such an annotation process.

Classification of DOM Tree Tags

In an embodiment of the invention, a segmentation algorithm traverses an annotated DOM tree, and each HTML tag at each node of the annotated DOM tree is classified as either a block separator, a text formatter, or a text layout. A block separator node is a node which necessarily separates a block. Block separator HTML tags create divisions in a rendered webpage. For example, the HTML tag br forces line breaks. A rendered webpage will have some space where there is a HTML tag br. The HTML tag br for rendering a line break is a text separator HTML tag, which is one type of a block separator. Other HTML tags create lines between text in the rendered webpage. The HTML tag hr for rendering a horizontal rule on a webpage is another example of such a block separator node. Both these types of HTML tags are among the set of HTML tags that are considered block separators.

A text formatter node is a node which affects the display properties of text. For example, HTML tags such as b (bold), i (italics), p (paragraph), font (font style, font size, and font color), are text formatter nodes. Text formatter HTML tags are an indication that the associated text is not to be separated into separate blocks.

Text layout HTML tags indicate that the webpage should be displayed in a certain way and should not be divided into too many different blocks. A text layout node is a node that determines how the text is grouped. Text layout nodes include, for example, div (division/section), td (cell in a table), and tr (row in a table).

These classifications have been found to provide the most useful information about segments of the webpage. However, the techniques described herein are not limited to the disclosed classifications and other classifications may be used. In an embodiment, a segmentation algorithm applies heuristics to the screen area annotations and the classification of HTML tags at the nodes to determine segments.

Traversing DOM Tree to Assign and Merge Segments

In an embodiment of the invention, a segmentation algorithm initially labels blocks by traversing a DOM tree from the root node of the DOM tree until a plain or field node is encountered. A plain or field node is all text, all link, or all image, etc. Plain and field nodes must occupy a somewhat reasonably large area on the screen, e.g. larger than two or three pixels. These nodes may be assigned blocks. However, the webpage should be divided into an optimum number of blocks and having each node assigned to an individual block may contribute to an excessive number of blocks. Thus, reduction of an excessive number of blocks involves consolidating and removing blocks.

In an embodiment of the invention, a segmentation algorithm begins the process of merging blocks by traversing from the plain or field nodes towards the root of the DOM tree. Various heuristics are used that provide, in an embodiment, a bottom-up approach to break down a webpage into segments. At certain DOM tree nodes, using the heuristics described herein, a decision is made whether to merge the blocks of sibling nodes into a segment, which sibling to merge with, whether to divide the blocks of nodes into different segments, or whether to merge the blocks of nodes that are not sibling nodes but that for which the corresponding visual aspects on the rendered webpage are close to each other. In an embodiment, a bottom up traversal of the DOM tree may examine just local node information to facilitate merging extraneous segments together to reduce the number of segments. In an embodiment, a top-down traversal of the DOM tree may also facilitate merging extraneous segments to reduce the number of segments.

Figure 3:
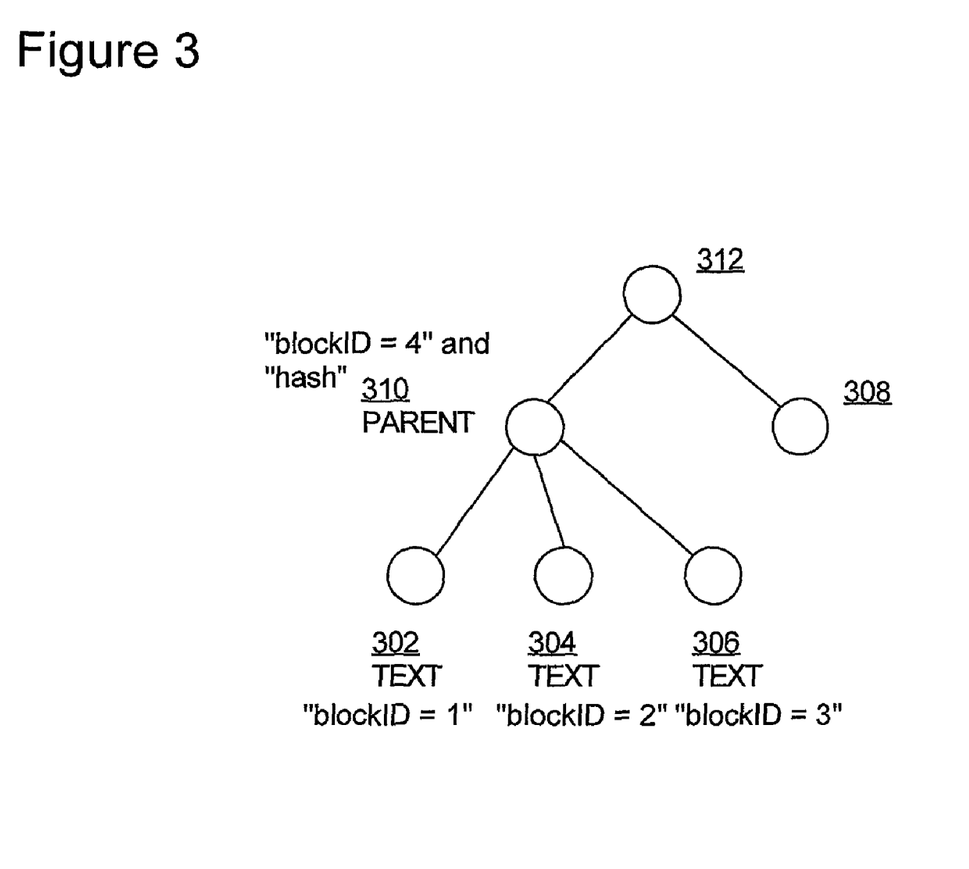
FIG. 3 is a block diagram illustrating annotations of a DOM tree

A node considered to be assigned a segment in one phase of the segmentation process may yet be merged with the block of another node in a later phase of the segmentation process to form a different segment. For example, in FIG. 3, the block of node 308 may be merged with the block of node 310 so that node 312 is established as a segment. A node considered to be assigned a segment may yet have its segment assignment removed and children of the node assigned different segments if, during a later phase of the segmentation process, the decision to assign a segment to the node turns out to be erroneous.

There are some heuristics that a segmentation algorithm may utilize for merging certain simple node configurations. As an example of such a heuristic-based merging, in FIG. 3, a segmentation algorithm might merge together the blocks of the three child nodes 302, 304, and 306 under one parent node PARENT 310 since the child nodes are all the same type, i.e. the nodes are all of type "TEXT". The parent text node PARENT 310 may then be assigned a segment, thereby including the child nodes within the segment.

Labeling DOM Tree Nodes

Labels placed on the DOM tree nodes to indicate blocks should be formed at a particular node may include, for example, a segment ID. Labels on merged blocks assigned to nodes indicate the blocks constitute a single segment. For example, in FIG. 3, TEXT 302 is labeled "blockID=1", TEXT 304 is labeled "blockID=2", and TEXT 306 is labeled "blockID=3". In a different phase of a segmentation algorithm, if parent node PARENT 310 is assigned a segment, PARENT 310 is labeled "blockID=4" and immediately the children nodes themselves are no longer assigned separate segments, but come under the segment of PARENT 310.

Preprocessing Steps

In an embodiment of the invention, a segmentation algorithm performs preprocessing steps that include pruning nodes that do not display any content on the webpage. For example, nodes such as empty cell nodes, br nodes, span nodes, etc., and their children nodes may be removed. In an embodiment, a segmentation algorithm may also prune some children nodes because the children nodes do not display any content.

In an embodiment, preprocessing steps include coalescing the blocks of all nodes with text formatter tags that are not separated by any block separator tags at the same root node. By this step, a segmentation algorithm aggregates the blocks of nodes that correspond to text on a webpage appearing continuously in the same format region. Block separators include, for example, thick table borders, certain kinds of thin page spanning images, etc. For example, assume there are two portions of text, rendered next to each another, corresponding to two sibling nodes, and there are no text separator nodes between the two text nodes (e.g. no HTML hr tag or some other HTML tag that breaks lines apart), then a segmentation algorithm might consider merging together the blocks of the two text nodes into a block of one text node.

Figure 4:
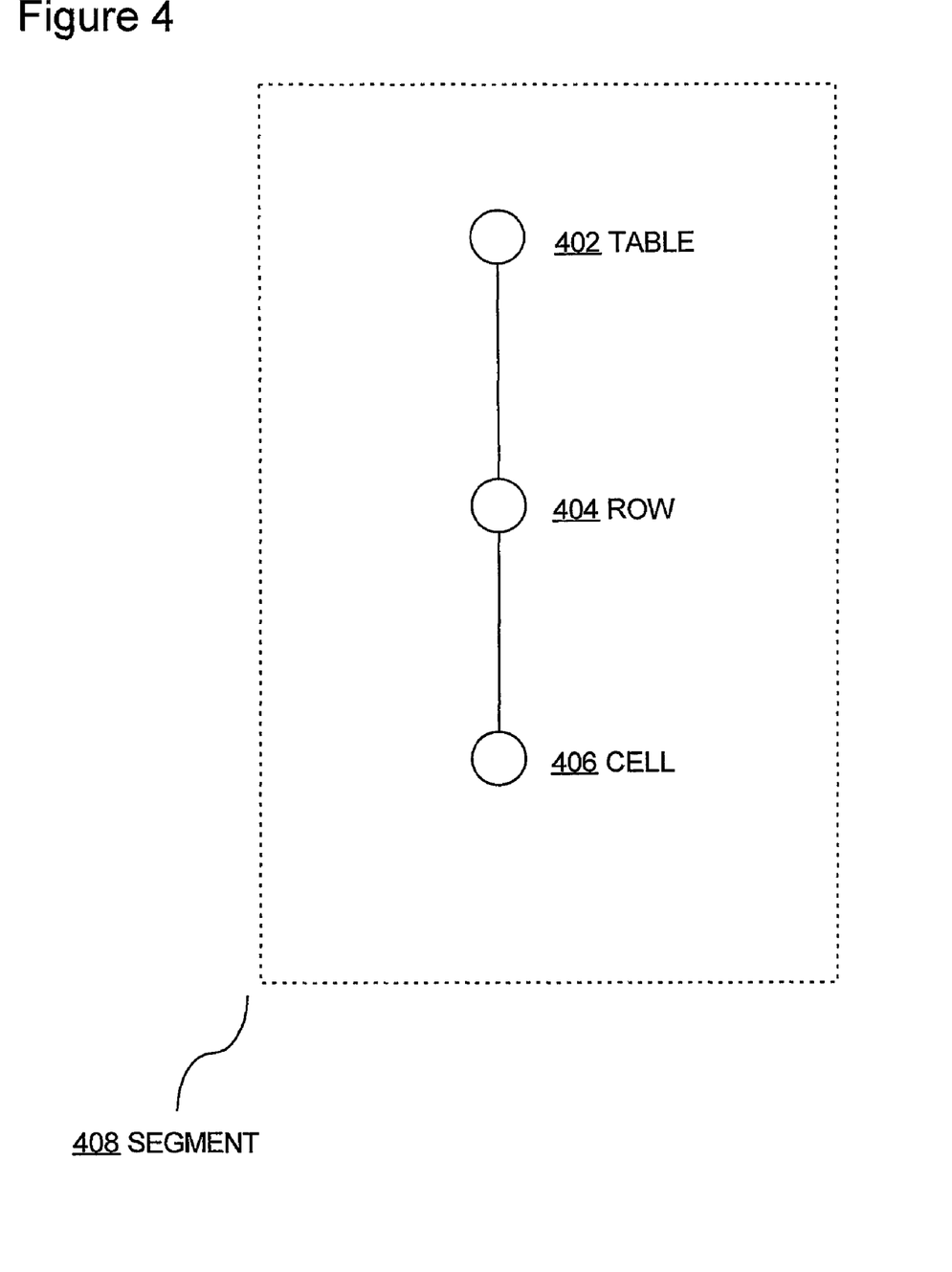
FIG. 4 is a block diagram illustrating a single segment assigned to a table node containing a single table data cell within a single table row.

In an embodiment, preprocessing steps include propagating blocks up all text formatter nodes which have all children nodes as part of the same block. Thus, a table containing a single HTML tag td (table data cell) within a single HTML tag tr (table row) is formed into a unique block instead of being uselessly split into multiple blocks. For example, FIG. 4 illustrates a node TABLE 402 containing a single table data cell node CELL 406 within a single table row node ROW 404. TABLE 402 is assigned one segment instead of having multiple segments for cells and rows. On the order hand, if there are more rows and cells then the rows or cells may be split into more segments.

In an embodiment, the above preprocessing steps may be performed in order, i.e. pruning nodes, coalescing blocks of nodes with text formatter tags at the same root node, and propagating blocks up text formatter nodes as described above.

Heuristics

In an embodiment of the invention, the OPTIMAL SEGMENTS NUMBER ESTIMATION heuristic ("OSNE") is the chief heuristic around which the other four heuristics described below will be based. In an embodiment, the other four heuristics listed after the OSNE heuristic may be performed in any order.

Optimal Segments Number Estimation Heuristic

In an embodiment of the invention, a segmentation algorithm applies the OSNE heuristic to estimate an optimal number of segments that a webpage can be divided into, based on the screen area occupied by the webpage. In an embodiment, a segmentation algorithm applying the OSNE heuristic might predefine such an estimation to be 12 for a webpage that requires 1024*768 pixels to be rendered properly, and the estimation is extrapolated linearly as necessary. The estimated optimal number of segments for the available webpage size drives decisions to perform additional merging or splitting of blocks. Thus, a segmentation algorithm coalesces blocks that are assigned to nodes in a DOM tree by trying to achieve the estimated optimal number of segments. Also, for any given block that has not yet been finally processed into segments or made into a part of some segment, the number of segments the block should be divided into may be calculated based on the fraction of the area of the webpage the block occupies. The typical optimum number of segments recommended for a webpage may vary from 9 to 12 recommended segments. In an embodiment, the intended electronic device upon which the webpage is to be displayed may affect the optimal number of segments calculation. In an embodiment, a segmentation algorithm performs an analysis of an entire website in order to apply the OSNE heuristic to estimate the optimal number of segments for webpages on that website. In an embodiment, a segmentation algorithm applying the OSNE heuristic may consider the location on a webpage of a webpage region when estimating the optimal number of segments recommended for that webpage region.

In an embodiment of the invention, a segmentation algorithm estimates an optimal number of segments for the subtree of certain nodes by applying the OSNE heuristic. The optimal number of segments estimated by the OSNE heuristic is a "recommended" value. However, nodes may only be assigned to one segment. In an embodiment, the various heuristics described below utilize the optimal number of segments recommended by the OSNE heuristic. For example, assume that the OSNE heuristic recommends a webpage to have 12 segments as an optimal number of segments. Then, a region within the webpage may be limited to having a certain number of maximum segments that are less than 12, e.g. 7 segments, depending on the size of the area occupied by the region on the webpage. If the segmentation algorithm somehow has previously assigned far more segments for that region, then the optimal number of segments recommended from the OSNE heuristic would be a basis for driving down the number of segments determined for that region. Reducing the number of segments is possible by merging more blocks together. Likewise, more segments may be added by splitting some blocks as necessary. In an embodiment, a segmentation algorithm may determine from a global view of segments of a DOM tree that there are too many segments assigned at a particular level of the DOM tree.

The heuristics described herein are illustrative of the techniques that may be used to determine segments of a webpage. Embodiments of the invention may include heuristics not as exactly described in this specification but operate under the same principles. FIG. 1 illustrates an exemplary DOM tree and webpage to setup the background for illustrating the heuristics described hereinafter.

Undue Number of Segments ("Unos") Heuristic

In an embodiment of the invention, if any subtree under a node of a DOM tree has more than twice the number of optimal blocks recommended for that node, then a segmentation algorithm attempts to coalesce the blocks of the nodes in the subtree with other blocks, so that there are fewer blocks, in a bottom-up fashion. In an embodiment, a segmentation algorithm performs the coalescing such that the blocks of leaf nodes are always coalesced with the blocks of sibling nodes, and such coalescing is continued upwards along the DOM tree as needed. Thus, a segmentation algorithm will aggressively merge the blocks assigned to nodes of such a subtree into larger segments in order to meet the optimal number of segments. In an embodiment, some multiplier other than "twice" will serve as a threshold to determine whether the blocks are coalesced. In an embodiment, if the OSNE heuristic recommends less than one segment for any node of a DOM tree, then a segmentation algorithm attempts to coalesce the blocks of the nodes with other blocks, so that there are fewer blocks, in a bottom-up fashion. In an embodiment, the coalescing is performed such that the blocks of leaf nodes are always coalesced with the blocks of nodes that are siblings with the leaf nodes, and continued upwards along the DOM tree as needed.

Figure 5:
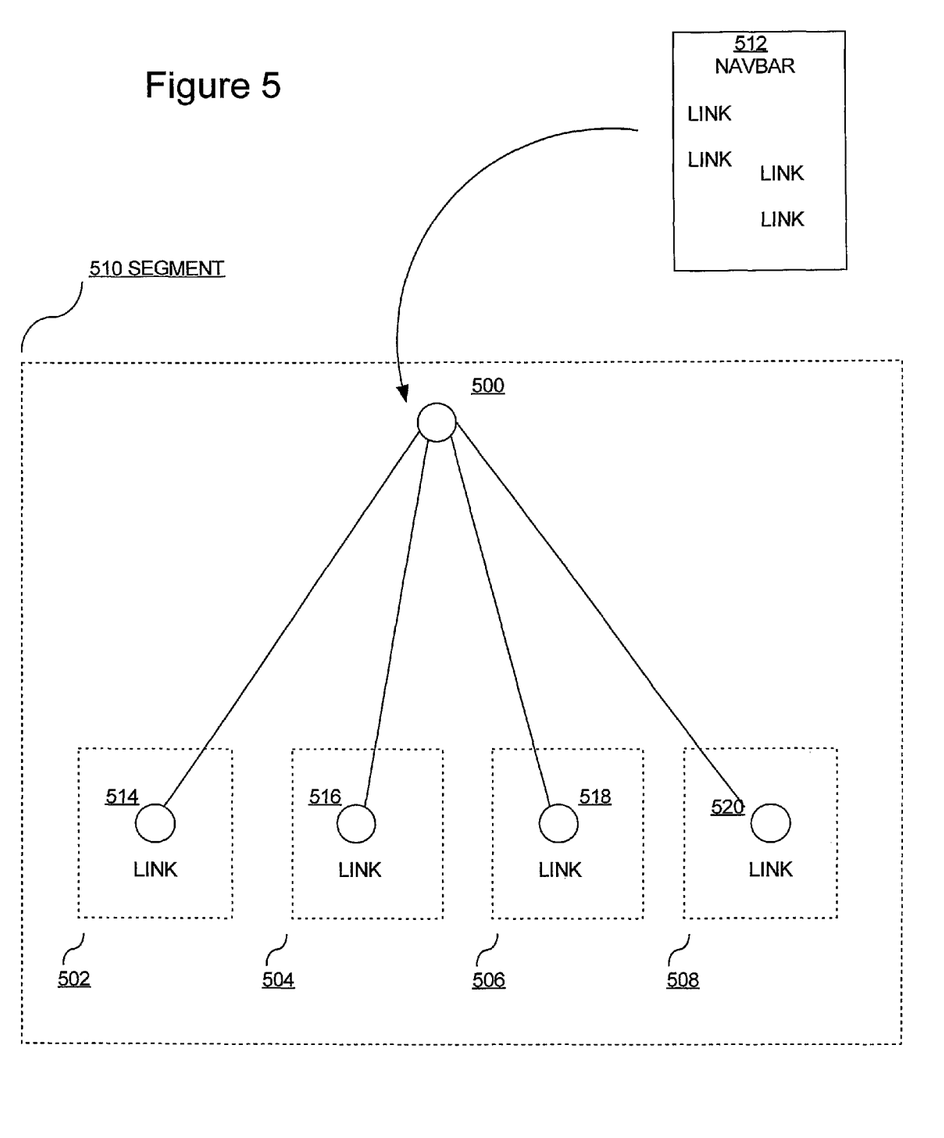
FIG. 5 is a block diagram illustrating the UNDUE NUMBER OF SEGMENTS heuristic.

FIG. 5 provides an example of this heuristic as applied to a navigation bar. Assume a navigation bar as shown in FIG. 1, with some modifications for purposes of illustrating the UNOS heuristic. The node subtree 500 of FIG. 5 corresponds to a navigation bar NAVBAR 512. The children nodes 514, 516, 518, and 520 of FIG. 5 each corresponds to a link on NAVBAR 512. Assume that the links on NAVBAR 512 occupy only 784 square pixels each. Initially, a segmentation algorithm assigns to each of the four children nodes 514, 516, 518, and 520 an individual small block. These small blocks are block 502, block 504, block 506, and block 508. However, assume that the OSNE heuristic recommendation of the optimal number of segments for each of the four child nodes is actually only 0.01 segments, based on the 784 square pixels that each link occupies on a webpage. 0.01 multiplied by two is 0.02, which is less than the minimum recommendation of at least one segment, and therefore each child node should not be assigned a segment. Thus, a segmentation algorithm aggregates the four blocks of the four child nodes together into a larger single segment SEGMENT 510. Note that the decision to aggregate is driven by the OSNE heuristic. In practice, this heuristic is useful for identifying navigation bar segments, or entire copyright segments.

Unused Whitespace Heuristic

In some cases, a node may correspond to visual layouts on a webpage with a lot of unused whitespace and with only a few children nodes. In an embodiment of the invention, a segmentation algorithm might not apply the UNOS heuristic if there are only a few segments actually assigned under that node. However, the children nodes of the node subtree may correspond to too small of a portion of the webpage and the children nodes themselves may have a very high actual to recommended block ratio, i.e. the ratio of the number of blocks actually assigned to the nodes over the number of blocks recommended for the nodes. In this case, the block assignments of the children nodes are "promoted" up to a common segment level assigned to the parent node. In an embodiment, a segmentation algorithm uses a threshold number or ratio to decide whether the children nodes should be promoted up to a common level assigned to the parent node. In an embodiment, the threshold number or ratio calculation includes using the OSNE heuristic. In an embodiment, a segmentation algorithm decides whether to promote the segments assigned to children nodes under a node by examining the node and the DOM subtree under that node. In an embodiment, a segmentation algorithm decides whether to promote the segment assigned to a node by examining the node and its parent node.

Figure 6:
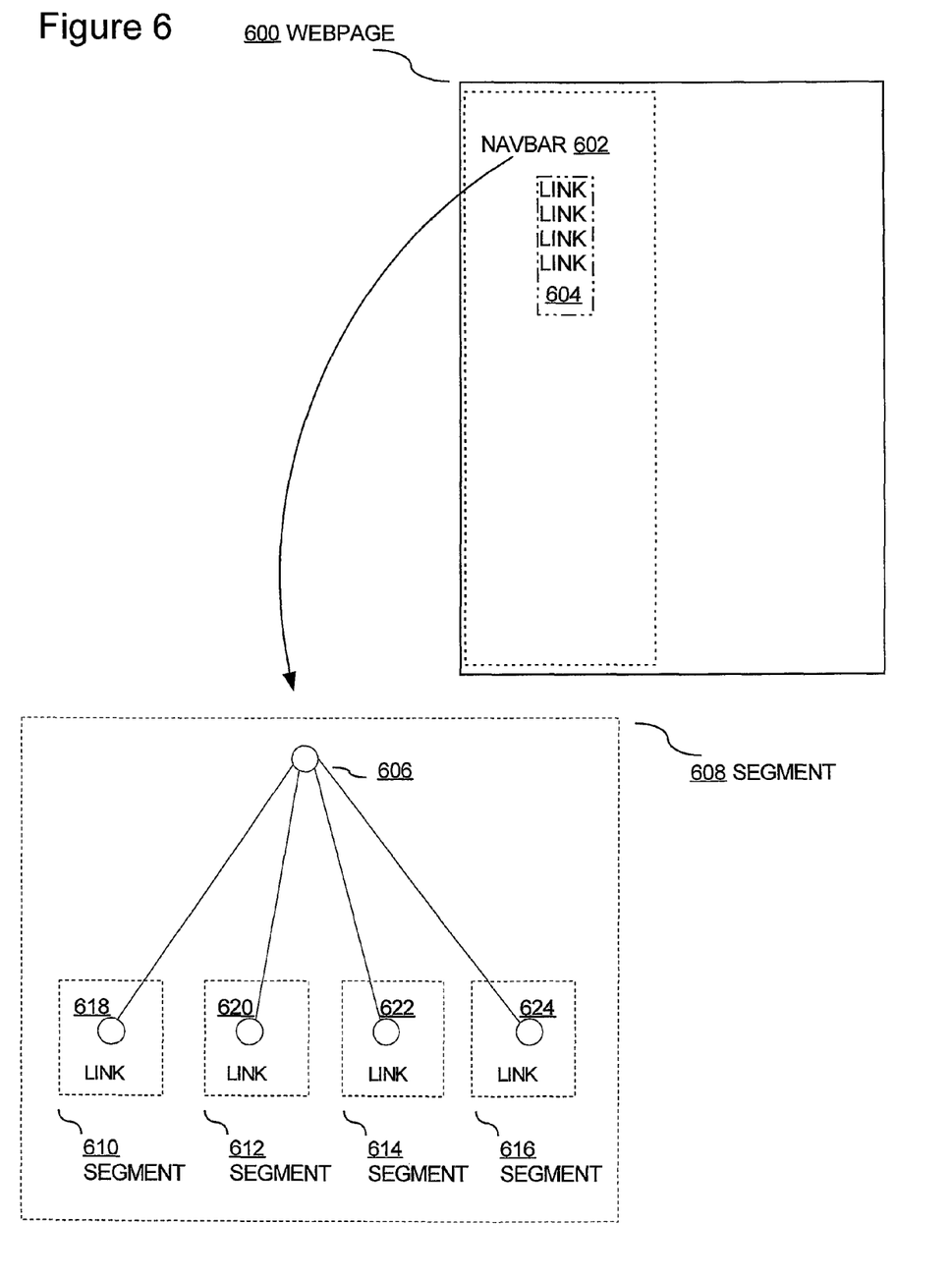
FIG. 6 is a block diagram illustrating the UNUSED WHITESPACE heuristic.

FIG. 6 provides an example of the UNUSED WHITESPACE heuristic as applied to a navigation bar. Assume a navigation bar similar to NAVBAR 128 of FIG. 1, with some modifications for purposes of illustrating the UNUSED WHITESPACE heuristic. In FIG. 6, a large navigation bar NAVBAR 602 occupies the entire left side of WEBPAGE 600. A DOM tree node 606 corresponding to the NAVBAR 602 has very few children nodes, i.e. only four children nodes as illustrated in FIG. 6. The portion of WEBPAGE 600 occupied by NAVBAR 602 is a very large portion of the available webpage space, and so initially no merging or coalescing would appear to be necessary. However, the rendering of each individual child node 618, 620, 622, and 624 of node 606 might occupy only a very small portion of the available webpage screen area occupied by NAVBAR 602. The rendered webpage area corresponding to the four children nodes 618, 620, 622, and 624 is the very small webpage area occupied by the four links 604. Thus, according to the UNUSED WHITESPACE heuristic, the assigned blocks of 610, 612, 614, and 616 for the four children nodes 618, 620, 622, and 624, respectively, should be changed to SEGMENT 608. That is, the four children nodes are "promoted" up to SEGMENT 608 of parent node 606.

Merge into Bigger Neighbor ("MIBN") Heuristic

In some circumstances, nodes are assigned segments that are below a threshold value, and therefore cannot stay as a segment. That is, the segments are too "small". However, the nodes might have sibling nodes with segments which occupy a sufficiently large portion of webpage space to stay as a segment. In an embodiment of the invention, a segmentation algorithm coalesces a segment that is below a threshold value and assigned to a node with a segment that is above the threshold value and is assigned to a sibling node. There should be no multiple segments under the subtree of the sibling node. Selection of a proper sibling node for merging segments involves selection from multiple candidates which can be done using visual features like font similarity (color/size) and vertical/horizontal separation. An FAQ webpage presents a common application of this heuristic. An FAQ webpage is usually composed of a series of question and answer pairs. The question usually occupies a much smaller portion of the webpage space than the webpage space occupied by the answer. In an embodiment, a segmentation algorithm applies the OSNE heuristic to perform a calculation of a threshold number used to decide whether a segment is too small to stay as a segment.

Figure 7:
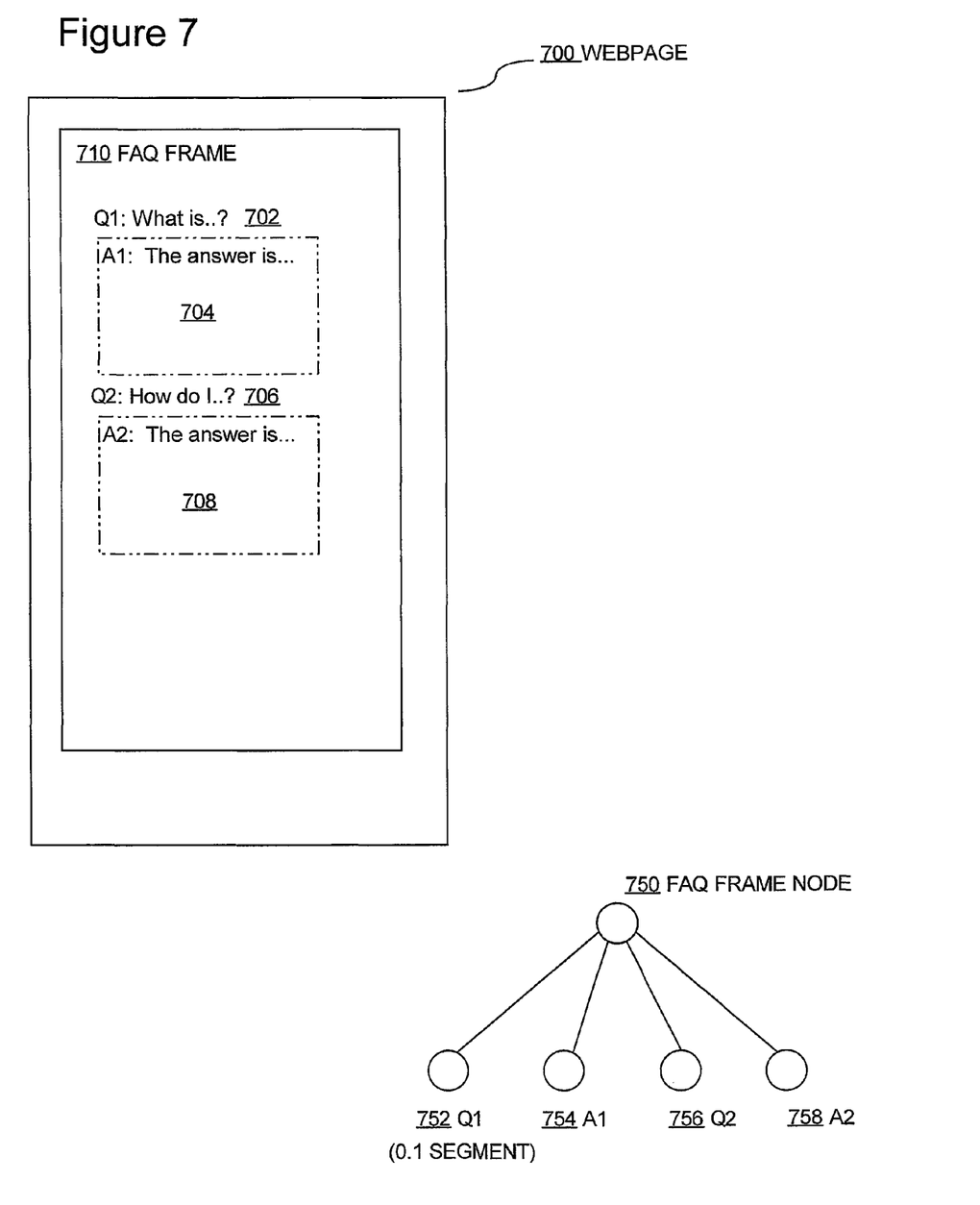
FIG. 7 is a block diagram illustrating the MERGE INTO BIGGER NEIGHBOR heuristic.

FIG. 7 illustrates the MIBN heuristic. WEBPAGE 700 is an example FAQ webpage. FAQ FRAME NODE 750 corresponds to FAQ FRAME 710 of the FAQ webpage that contains the series of question and answers. FAQ FRAME 710 corresponding to FAQ FRAME NODE 750 occupies quite a large space on WEBPAGE 700, and encompasses all the questions and answers.

Only two question and answer pairs are shown in WEBPAGE 700 for purposes of illustration but usually FAQ webpages have much more question and answer pairs. The first question Q1 702 occupies a very small portion of FAQ FRAME 710. The first answer A1 704 occupies a much bigger portion of FAQ FRAME 710. As an example, the OSNE heuristic recommends that for the first question Q1 702, only 0.1 segment is assigned to the node Q1 752 because the first question Q1 702 occupies so very little webpage area. The OSNE heuristic also recommends that for the second question Q2 706, only 0.1 segment is assigned to the node Q2 756, and so on for every other question in the series of questions of the FAQ. To continue the example, the OSNE heuristic recommends that for all of the rendered answers, including A1 704 and A2 708, each rendered answer should have 1.0 segment assigned to each respective answer node A1 754 and A2 758, because the rendered answers each occupy a portion of the webpage area that is appropriate for 1.0 segment.

To continue the example, the segments of the answer nodes are not merged together with segments assigned to any other answer nodes because the answer nodes correspond to webpage areas that are sufficiently large, i.e. each answer occupies a webpage area sufficient for 1.0 segment. However, since the OSNE heuristic recommends that the question nodes have only 0.1 segments each, in an embodiment, the segment of each question node should each be merged into a segment assigned to a node that is a sibling with the question node when applying the MIBN heuristic.

Continuing the example, Q1 752 and A1 754 are sibling nodes. The OSNE heuristic recommends that number of segments for Q1 752 is only 0.1, thus a search is made along the DOM tree for a sibling of Q1 752 that has a whole segment. The segmentation algorithm finds that A1 754 has 1.0 recommended number of segments, and is a sibling of Q1 752. Thus, the segmentation algorithm merges together the segments of nodes Q1 752 and A1 754 to form a single segment.

Note that by examining the DOM tree alone, the segment of node Q2 756 may be merged with either the segment of node A1 754 or the segment of node A2 758. A1 754 and A2 758 are both siblings of Q2 756 and each has 1.0 segment. In this case, various visual aspects of WEBPAGE 700 may be used to decide whether to merge the segment of node Q2 756 with the segment of node A1 754 or the segment of node A2 758. Visual indicators useful for merging decisions include the font color of the questions and answers, extra spacing between an answer and question, and whether the question appears earlier or the answer appears earlier. For example, in some FAQ webpages both an answer that answers a question and the question are the same color. The color of one particular question and answer pair may be different from the color of another question and answer pair, which allows for deciding which question should be paired with which answer. While various visual indicators are described, the techniques described herein are not limited to the disclosed visual indicators and the techniques described herein may be applicable to other visual indicators.

Figure 8:
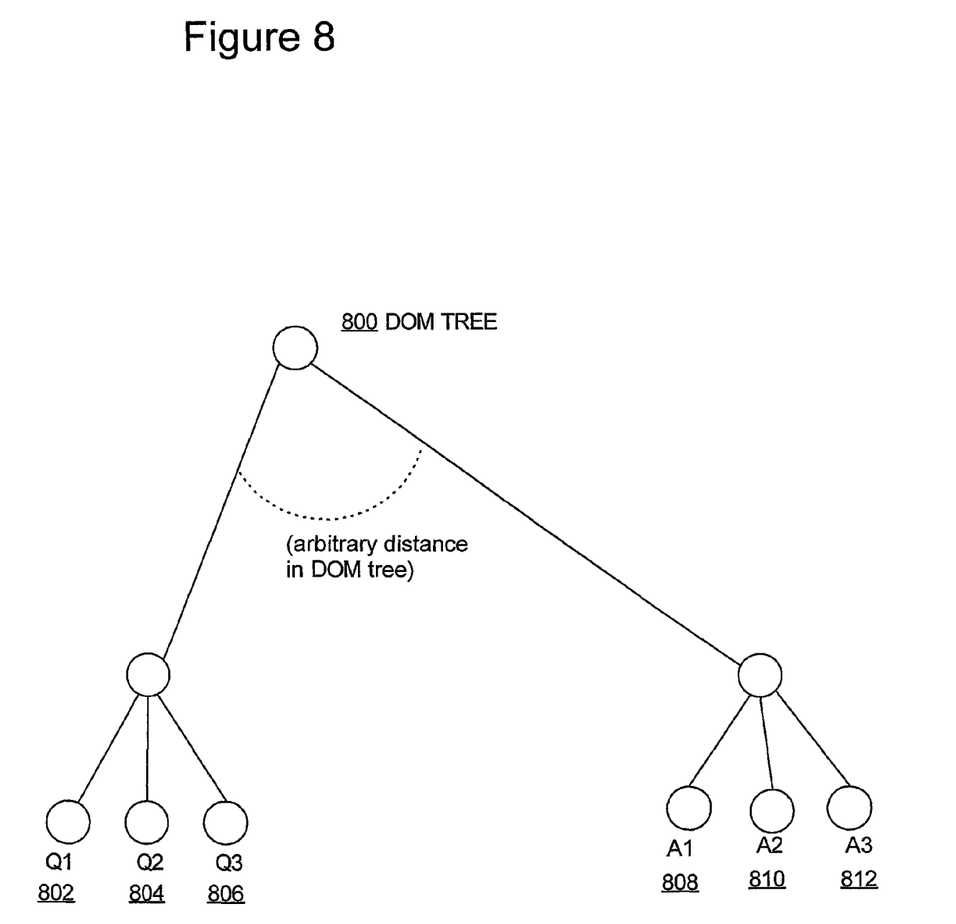
FIG. 8 is a block diagram illustrating the MERGE INTO BIGGER NEIGHBOR heuristic for nodes that are not siblings but are visually close in a rendered webpage.

In an embodiment of the invention, a segmentation algorithm may still merge the blocks of nodes that are not siblings in the DOM tree but are visually close together in a rendered webpage. For example, in FIG. 8, the question nodes Q1 802, Q2 804 and Q3 806 are not each siblings with a corresponding answer node from the answer nodes A1 808, A2 810 and A3 812 in DOM TREE 800. However, assume that the questions and answers are interleaved in a rendered webpage such that each question is followed by the corresponding answer. Also assume, as illustration, that the answer nodes each have 1.0 recommended number of segments, and the question nodes each have 0.1 recommended number of segments. The block of each question node should then be merged together with the block of the corresponding answer node. Thus, in an embodiment, a segmentation algorithm merges not only the blocks of sibling nodes, but will also merge the blocks of nodes that are not siblings but are visually close together. However, in an embodiment, siblings that are not rendered together should not have their blocks merged. Visual indicators thus drive the decisions to merge nodes. In summary, in an embodiment of the invention, a segmentation algorithm might use any one or all or any combination of the visual indicators including visual features on the rendered webpage, visual distance on the rendered webpage, existence of a sibling relationship, and other visual indicators to decide whether to merge blocks assigned to nodes.

Splitting Coarse Blocks Heuristic

In an aspect of the invention, if a block is too "coarse", a segmentation algorithm recursively analyzes the block and splits up the block in a demand-driven fashion. In an embodiment, a block may be too coarse if the block corresponds to a sufficiently large portion of a webpage that surpasses a certain threshold portion size. In an embodiment, a segmentation algorithm uses the OSNE heuristic to decide whether a block is too coarse. In an embodiment, a segmentation algorithm splits a block by considering child nodes of the block in sequence, and looking for significant whitespace between rendered elements corresponding to the child nodes. In an embodiment, a segmentation algorithm will consider any whitespace found by examining whether the whitespace is vertical or horizontal, and the properties of the rendered elements on either side of the whitespace (text density, font color, font size, etc.). For example, a root node of a DOM tree may represent the entire webpage and thus the block of the root node is too coarse. In an embodiment, to split the block, all the heuristics discussed herein may be used to recursively split the block of the root node into more blocks for the children nodes, so that the resulting segments are not too coarse.

Hardware Overview

Figure 10:
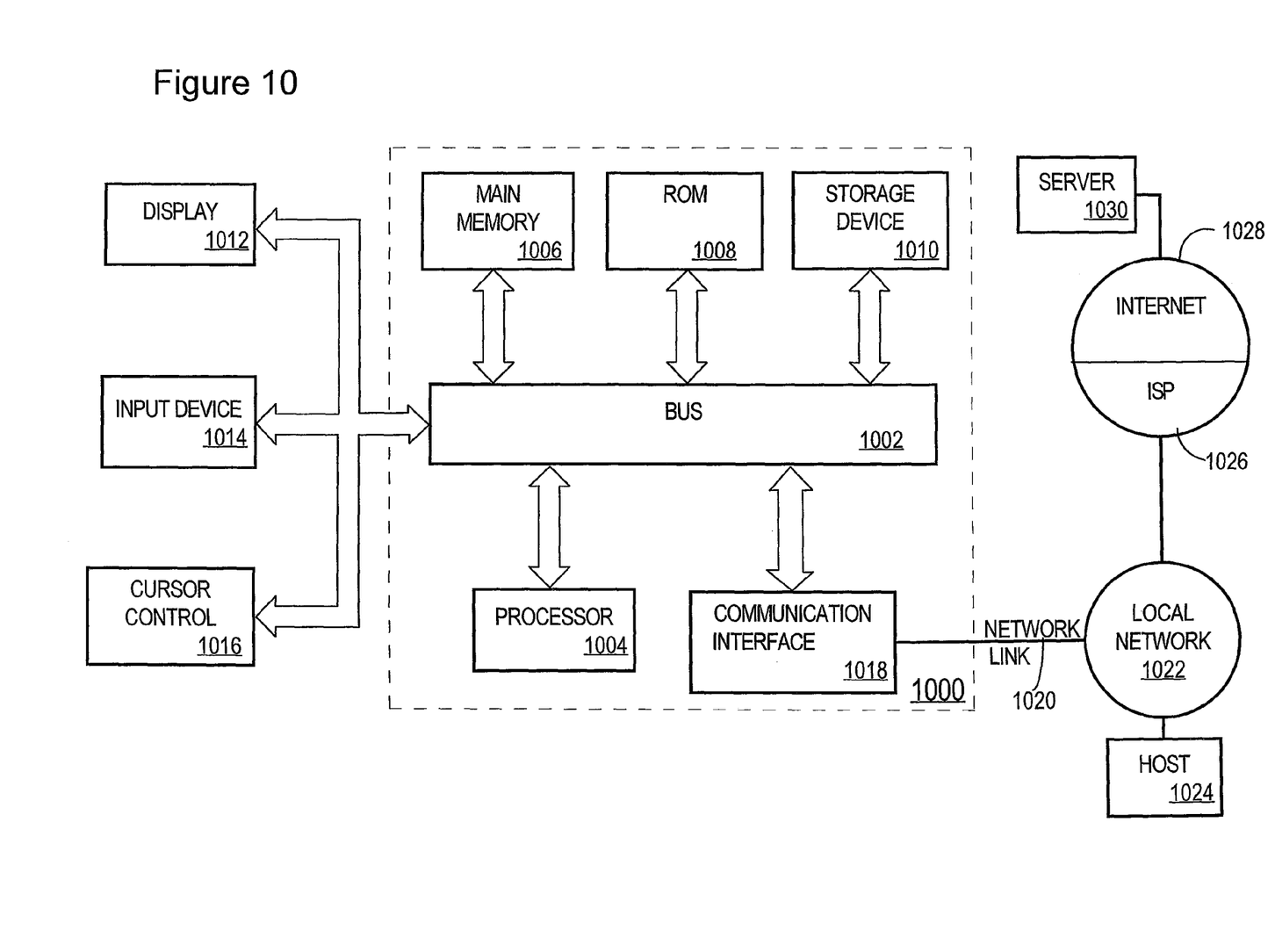
FIG. 10 is a block diagram illustrating a computer system that may be used in implementing an embodiment of the present invention.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to storage media and transmission media. Storage media includes both non-volatile media and volatile media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to divide a webpage into semantic units, comprising computer-executed steps of:
    estimating a target optimal number that represents how many semantic units should be associated with said webpage;
    identifying what fraction of said webpage is occupied by a rendered area associated with a node of a DOM tree corresponding to said webpage;
    determining whether the fraction multiplied by said target optimal number is below a threshold number; and
    in response to determining that said fraction multiplied by said target optimal number is below the threshold number, merging a first semantic unit associated with said node with a second semantic unit associated with a second node into a single semantic unit;
    wherein the method is performed by one or more computing devices.

2. The method of claim 1, further comprising:
    wherein merging is performed by:
        searching for said second node in said DOM tree;
        estimating a second number that represents how many semantic units should be associated with said second node, wherein said second number is greater than or equal to said threshold number; and
        merging said first semantic unit and said second semantic unit into said single semantic unit.

3. The method of claim 1, further comprising:
    wherein a subtree of said second node is associated with only one semantic unit.

4. The method of claim 1, further comprising:
    wherein said node and said second node are siblings.

5. The method of claim 1, further comprising:
    wherein said node and said second node are not siblings.

6. A method to divide a webpage into semantic units, comprising computer-executed steps of:
    estimating a target optimal number that represents how many semantic units should be associated with said webpage;
    identifying what fraction of said webpage is occupied by a rendered area on said webpage, wherein said rendered area corresponds to a semantic unit;
    determining whether the fraction multiplied by said target optimal number exceeds a threshold number; and
    in response to determining that said fraction multiplied by said target optimal number exceeds said threshold number, dividing said semantic unit into a plurality of semantic units;
    wherein the method is performed by one or more computing devices.

7. The method of claim 6, further comprising:
    wherein dividing is performed by recursively dividing said semantic unit.

8. The method of claim 6, further comprising:
    wherein dividing is performed by looking for a significant whitespace between rendered elements on said webpage.

9. The method of claim 6, further comprising:
    wherein dividing further comprises examining whether a significant whitespace is vertical or horizontal.

10. The method of claim 6, further comprising:
    wherein dividing further comprises examining one or more properties of rendered elements on said webpage on either side of a significant whitespace.

11. The method of claim 6, further comprising:
    wherein dividing is performed by applying an optimal segments number estimation heuristic.

12. A non-transitory computer-readable storage medium carrying one or more sequences of instructions which, when executed by one or more processors, causes performance of the method recited in claim 1.

13. A non-transitory computer-readable storage medium carrying one or more sequences of instructions which, when executed by one or more processors, causes performance of the method recited in claim 2.

14. A non-transitory computer-readable storage medium carrying one or more sequences of instructions which, when executed by one or more processors, causes performance of the method recited in claim 3.

15. A non-transitory computer-readable storage medium carrying one or more sequences of instructions which, when executed by one or more processors, causes performance of the method recited in claim 4.

16. A non-transitory computer-readable storage medium carrying one or more sequences of instructions which, when executed by one or more processors, causes performance of the method recited in claim 5.

17. A non-transitory computer-readable storage medium carrying one or more sequences of instructions which, when executed by one or more processors, causes performance of the method recited in claim 6.

18. A non-transitory computer-readable storage medium carrying one or more sequences of instructions which, when executed by one or more processors, causes performance of the method recited in claim 7.

19. A non-transitory computer-readable storage medium carrying one or more sequences of instructions which, when executed by one or more processors, causes performance of the method recited in claim 8.

20. A non-transitory computer-readable storage medium carrying one or more sequences of instructions which, when executed by one or more processors, causes performance of the method recited in claim 9.

21. A non-transitory computer-readable storage medium carrying one or more sequences of instructions which, when executed by one or more processors, causes performance of the method recited in claim 10.

22. A non-transitory computer-readable storage medium carrying one or more sequences of instructions which, when executed by one or more processors, causes performance of the method recited in claim 11.

* * * * *